(12) United States Patent
Zalewski

(10) Patent No.: US 8,771,071 B2
(45) Date of Patent: Jul. 8, 2014

(54) SYSTEM AND METHOD OF RENDERING CONTROLLER INFORMATION

(75) Inventor: Gary Zalewski, Oakland, CA (US)

(73) Assignee: Sony Computer Entertainment America LLC, San Mateo, CA (US)

(*) Notice: Subject to any disclaimer, the term of this patent is extended or adjusted under 35 U.S.C. 154(b) by 1089 days.

(21) Appl. No.: 11/986,356

(22) Filed: Nov. 21, 2007

(65) Prior Publication Data

US 2008/0119272 A1    May 22, 2008

Related U.S. Application Data

(60) Provisional application No. 60/860,938, filed on Nov. 22, 2006, provisional application No. 60/860,937, filed on Nov. 22, 2006, provisional application No. 60/860,936, filed on Nov. 22, 2006.

(51) Int. Cl.
*A63F 13/10* (2006.01)

(52) U.S. Cl.
USPC .............................. 463/36; 463/37; 345/158

(58) Field of Classification Search
USPC ................... 463/36–39; 702/152; 345/158
See application file for complete search history.

(56) References Cited

U.S. PATENT DOCUMENTS

| | | | | |
|---|---|---|---|---|
| 5,358,259 A | * | 10/1994 | Best | 463/31 |
| 5,551,701 A | | 9/1996 | Bouton et al. | |
| 5,846,086 A | | 12/1998 | Bizzi et al. | |
| 5,936,611 A | | 8/1999 | Yoshida | |
| 6,001,017 A | * | 12/1999 | Okano et al. | 463/43 |
| 6,288,753 B1 | | 9/2001 | DeNicola et al. | |
| 6,585,593 B1 | * | 7/2003 | Okano et al. | 463/31 |
| 6,620,043 B1 | | 9/2003 | Haseltine et al. | |
| 6,876,496 B2 | | 4/2005 | French et al. | |
| 6,966,778 B2 | | 11/2005 | Macri et al. | |
| 6,995,310 B1 | * | 2/2006 | Knapp et al. | 84/722 |
| 7,001,272 B2 | * | 2/2006 | Yamashita et al. | 463/7 |
| 7,008,322 B1 | | 3/2006 | Suzuki et al. | |
| 7,202,851 B2 | * | 4/2007 | Cunningham et al. | 345/156 |
| 7,223,913 B2 | * | 5/2007 | Knapp et al. | 84/722 |
| 7,239,301 B2 | | 7/2007 | Liberty et al. | |
| 7,288,712 B2 | * | 10/2007 | Uehara | 84/645 |
| 7,424,388 B2 | * | 9/2008 | Sato | 702/152 |
| 7,485,042 B2 | | 2/2009 | Nakatsuka et al. | |
| 7,627,139 B2 | | 12/2009 | Marks et al. | |
| 7,632,186 B2 | | 12/2009 | Spanton et al. | |
| 7,646,372 B2 | * | 1/2010 | Marks et al. | 345/156 |
| 7,683,883 B2 | * | 3/2010 | Touma et al. | 345/163 |
| 8,025,572 B2 | * | 9/2011 | Spanton et al. | 463/42 |
| 2002/0149583 A1 | * | 10/2002 | Segawa et al. | 345/420 |
| 2002/0163497 A1 | * | 11/2002 | Cunningham et al. | 345/156 |
| 2004/0063084 A1 | | 4/2004 | Macri et al. | |
| 2004/0244570 A1 | * | 12/2004 | Ando | 84/744 |

(Continued)

OTHER PUBLICATIONS

Wii Operations Manual, Nintendo of America, 2006.*

(Continued)

*Primary Examiner* — Arthur O Hall
*Assistant Examiner* — Allen Chan
(74) *Attorney, Agent, or Firm* — Lerner, David, Littenberg, Krumholz & Mentlik, LLP

(57) ABSTRACT

A system and method relating to, in one aspect, detecting the position or orientation of a device, in the physical domain, during a processor-implemented game, and displaying the game substantially simultaneously with displaying a graphic representing the position or orientation of the device.

20 Claims, 10 Drawing Sheets

(56) References Cited

U.S. PATENT DOCUMENTS

| | | | | |
|---|---|---|---|---|
| 2005/0150362 | A1* | 7/2005 | Uehara | 84/645 |
| 2005/0237296 | A1* | 10/2005 | Lee | 345/156 |
| 2006/0082546 | A1* | 4/2006 | Wey | 345/156 |
| 2006/0107826 | A1* | 5/2006 | Knapp et al. | 84/724 |
| 2006/0111197 | A1* | 5/2006 | Yamamoto et al. | 473/151 |
| 2007/0087797 | A1 | 4/2007 | Van Luchene | |
| 2007/0089590 | A1 | 4/2007 | Katou | |
| 2007/0117635 | A1* | 5/2007 | Spanton et al. | 463/43 |
| 2007/0265084 | A1* | 11/2007 | Sato et al. | 463/37 |
| 2008/0160492 | A1 | 7/2008 | Campbell et al. | |

OTHER PUBLICATIONS

Wii Sports Manual, Nintendo of America, 2006.*

Wii Operations Manual, Nintendo of America, 2006, which can be found at http://www.gamepro.com/article/news/86488/full-nintendo-wii-manual-uploaded/ with a date of Nov. 14, 2006 or www.nintendo.com/consumer/downloads/WiiChEng.pdf.*

Wii Operations Manual, Nintendo of America, 2006, which can be found at http://www.gamepro.com/article/news/86488/fullnintendo-wii-manual-uploaded/ with a date of Nov. 14, 2006 or www.nintendo.com/consumer/downloads/WiiChEng.pdf.*

Wii Sports Manual, Nintendo of America, 2006, which can be found at www.nintendo.com/consumer/gameslist/manuals/Wii_Wii_Sports.pdf.*

Semsey "Tiger Woods PGA Tour 2005 Preview" (Blog post) Jul. 22, 2004,from http://previews.teamxbox.com/xbox/829/Tiger-Woods-PGA-Tour-2005/p1/; Instruction manual for the game, from http://www.gamesegment.com/XBOX/instructions.cfm/id/3602474; and video of the game play, viewable from http://www.gamespot.com/video/6108095 (screenshots), incl. in pdf doc.*

Gun, Tommy, "Guitar Hero II demo—Strutter (expert) with fingering!", You Tube upload date of Oct. 9, 2006, CrackedRabbitGaming.com, viewed from http://www.youtube.com/watch?v=pol0-wYckxl, screen shots taken by USPTO on Aug. 11, 2012.*

Mavis Beacon Teaches Typing, Version 15, User's Guide, 2002, Riverdeep, p. 10.

Office Action from U.S. Appl. No. 11/986,551 mailed Feb. 16, 2011.

Office Action from U.S. Appl. No. 11/986,436 mailed Feb. 16, 2011.

Final Office Action from U.S. Appl. No. 11/986,551 dated Aug. 4, 2011 (20 pgs).

Final Office Action from U.S. Appl. No. 11/986,436 dated Jul. 19, 2011 (22 pgs).

Office Action from U.S. Appl. No. 11/986,551, dated Dec. 22, 2011 (22 pgs).

Office Action from U.S. Appl. No. 11/986,436, dated Dec. 29, 2011 (29 pgs).

* cited by examiner

SYSTEM AND METHOD OF RENDERING CONTROLLER INFORMATION

CROSS-REFERENCE TO RELATED APPLICATIONS

This application claims the benefit of the filing date of U.S. Provisional Patent Application Nos. 60/860,936, 60/860,937 and 60/860,938, all filed Nov. 22, 2006, the disclosures of which are all hereby incorporated herein by reference.

BACKGROUND OF THE INVENTION

Video and electronic games have become increasingly complex over time. Game characters are capable of executing more maneuvers, and game controllers have incorporated more controls. For example, aside from including more buttons and joysticks, many game controllers may be tilted, turned, raised, or lowered in order to accomplish a particular move. Correspondingly, it would help users if they could increase their knowledge of controller manipulation.

Prior games have offered in-game instructions regarding which buttons to press, or the direction to push a joystick, in order to accomplish particular functions or moves. These games may include a graphic display of a controller. However, these games fall short of tutoring a user on the best way to use a controller.

The present invention is directed to this need.

SUMMARY OF THE INVENTION

In one aspect, the present invention provides a method of displaying data comprising: detecting the position or orientation of a device, in the physical domain, during a processor-implemented game; and displaying the game substantially simultaneously with displaying a graphic representing the position or orientation of the device.

DETAILED DESCRIPTION

Figure 1:
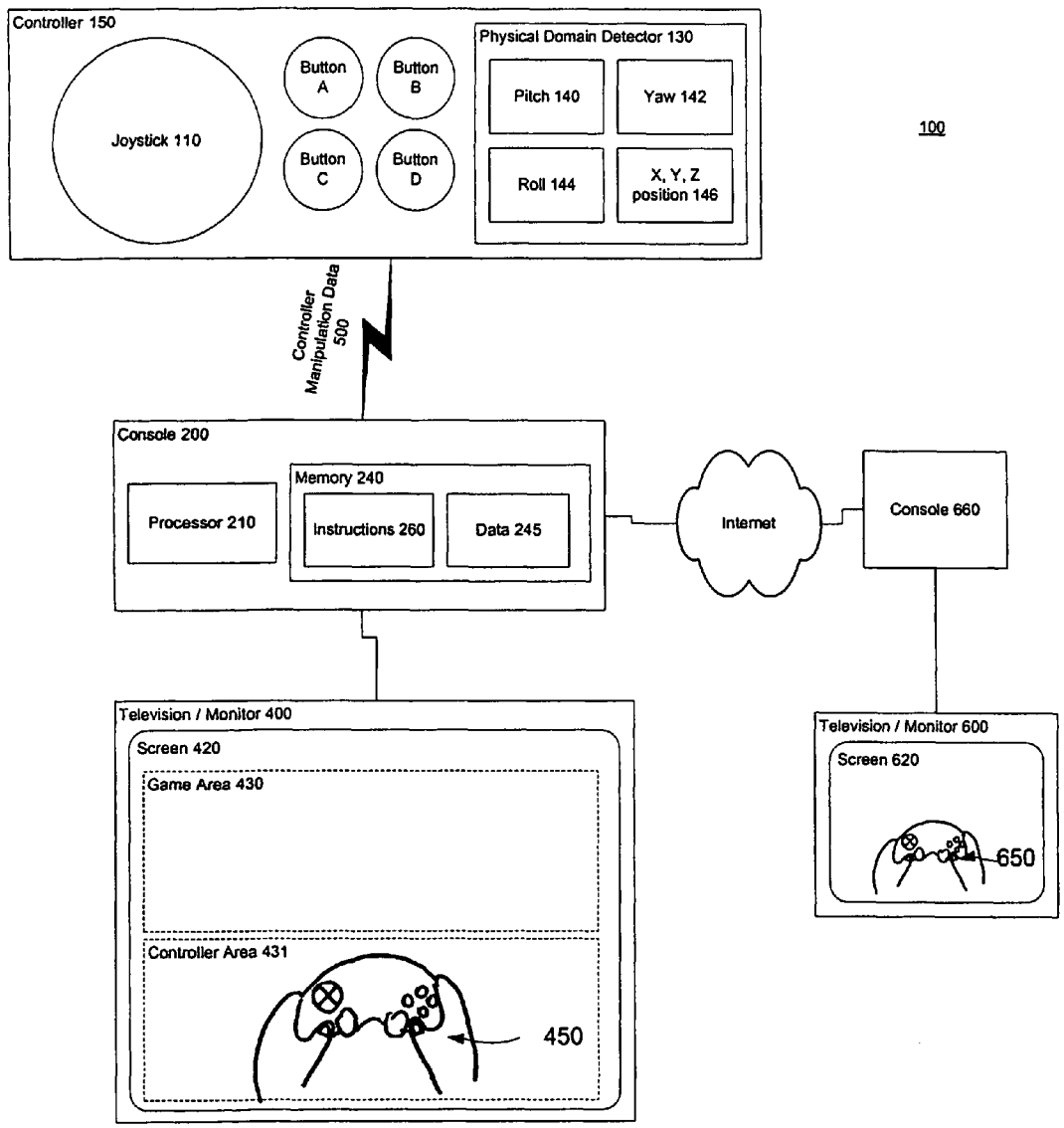
FIG. 1 illustrates a system in accordance with an aspect of the invention.

FIG. 1 shows a system in accordance with one aspect of the invention. A controller 150 is electrically connected to a first console 200, which is further connected to a first monitor 400. The first console 200 may be linked to a second console 660, which is electrically connected to a second monitor 600.

The console 200 may be a game console, such as Sony PlayStation®, and include a processor 210 and a memory 240. The memory stores instructions 260 and data 245. Data 245 is retrieved, manipulated or stored by the processor. The memory may be of any type capable of storing information accessible by the processor; by way of example, hard-drives, ROM, RAM, CD-ROM, DVD, write-capable memories, and read-only memories.

The instructions 160 may comprise any set of instructions to be executed directly (e.g., machine code) or indirectly (e.g., scripts) by the processor. The terms "instructions," "steps" and "programs" may be used interchangeably herein. The functions, methods and routines of the program in accordance with the present invention are explained in more detail below.

Instructions in accordance with the present invention may be stored on the console as routines and called either called by game-specific instructions or function as middleware which is invisible to the game-specific instructions. Alternatively, the present invention may be implemented in the game-specific instructions.

Data 245 may be retrieved, stored or modified by processor 210 in accordance with the instructions 260. The data may be stored in any manner known to those of ordinary skill in the art such as in computer registers, in records contained in tables and relational databases, or in XML files. The data may also be formatted in any computer readable format such as, but not limited to, binary values, ASCII or EBCDIC (Extended Binary-Coded Decimal Interchange Code). Moreover, any information sufficient to identify the relevant data may be stored, such as descriptive text, proprietary codes, pointers, or information which is used by a function to calculate the relevant data.

Although the processor and memory are functionally illustrated in FIG. 1 as within the same block, it will be understood by those of ordinary skill in the art that the processor and memory may actually comprise multiple processors and memories that may or may not be stored within the same physical housing. For example, some of the instructions and data may be stored on a removable CD-ROM and others within a read-only computer chip. Some or all of the instructions and data may be stored in a location physically remote from, yet still accessible by, the processor. Similarly, the processor may actually comprise a collection of processors which may or may not operate in parallel.

As noted above, system 100 may comprise additional components typically found in a game console or computer system such as other user inputs (e.g., a keyboard, mouse, touch-sensitive screen), microphone, modem (e.g., telephone or cable modem), camera, and all of the components used for connecting these elements to one another. Game console 200 preferably communicates with the Internet via the modem or some other communication component such as a network card.

Instead of a game console, the system may also comprise any user device capable of processing instructions and transmitting data to and from humans or other computers or devices, including general purpose computers, network computers lacking local storage capability, PDA's with modems and Internet-capable or other wireless phones, digital video recorders, video cassette recorders, cable television set-top boxes or consumer electronic devices.

The controller 150 may include a variety of controls. For example, it may include at least one joystick 110 and multiple buttons A, B, C and D. The controller 150 may also include a physical domain detector 130. The physical domain detector 130 may detect changes in position of the controller 150, e.g., if the controller 150 is turned, tilted, raised or lowered. According to one aspect of the present invention, the physical domain detector 130 may have a separate component to detect each type of position change. For example, pitch component 140 may detect an upwards or downwards tilt of a front end of the controller 150, whereas yaw component 142 detects rotation of the controller 150 around a vertical axis, and roll component 144 detects when one side of the controller 150 is raised or lowered with respect to another side. Further, X-Y-Z position component 146 may detect the distance of the detector's center from some reference point, such as its distance from the console 200 in the X, Y and Z directions. Methods of detecting the physical position and orientation of a controller are described in U.S. patent application Ser. No. 11/382,032 the disclosure of which is hereby incorporated by reference.

As a user manipulates the controller 150, manipulation data 500 relating thereto is transmitted to the console 200. For example, the controller may transmit the state of the joystick 110 and buttons A-D as well as the orientation and position of the controller 150 in the physical domain, such as its current X-Y-Z position, pitch, yaw and roll.

The controller manipulation data may be received or determined by the console 200 in a number of ways. For example, the controller manipulation data 500 may be received from controller 150 and stored in real-time, e.g., as the controller 150 is being manipulated by the user. The controller manipulation data may also have been pre-stored in memory 240, such as being written or captured by a game programmer and stored among the other data in a game disk inserted in console 200. Some or all of the controller manipulation data 500 may be determined at the console 200, which may occur, by way of example, when the console determines the controller's X, Y and Z position by using a camera attached to the console which tracks the physical position of the controller 150. Alternatively, the controller manipulation data may be received from another console or node of a network.

The controller manipulation data may be encoded in any number of ways. For example, the position of the controller 150 in the physical domain (e.g., height in the Z direction) may be encoded as absolute or relative values as a function of set time increments (e.g., 105 mm above the console at $t_0$, 108 mm above the console at $t_{0+5\ ms}$, 111 mm above the console at $t_{0+10\ ms}$). Alternatively, the position of the controller may be encoded as gestures (e.g., "raised 6 mm over 10 ms"). Storing gestures may be more advantageous than storing positions at time increments because the gestures may take up less memory space. In that regard, the console 200 may receive the controller manipulation data 500 as position data at fixed time increments, determine gestures from such data, and then store the controller manipulation data in the form of gestures as data 245 in memory 240.

Monitor 400 receives its display data from console 200 and includes a screen 420. Preferably, the console's program virtually divides the screen into different areas, such as game area 430 and controller area 431. Game area 430 displays the video game (i.e., characters, background, etc.) being played by a first user.

The controller area 431 displays a controller graphic 450, which provides a graphical view of the manipulation of the controller (such as text, picture or a combination of both). The controller graphic 450 illustrates the various ways in which a controller may be manipulated, such as the movement of its joystick, its buttons, or its orientation and position in the physical domain. Preferably, the controller graphic is an image of hands and a controller performing the user's manipulations of the controller 150. Console 200 renders the controller graphic 450 by decoding the controller manipulation data.

Figure 2:
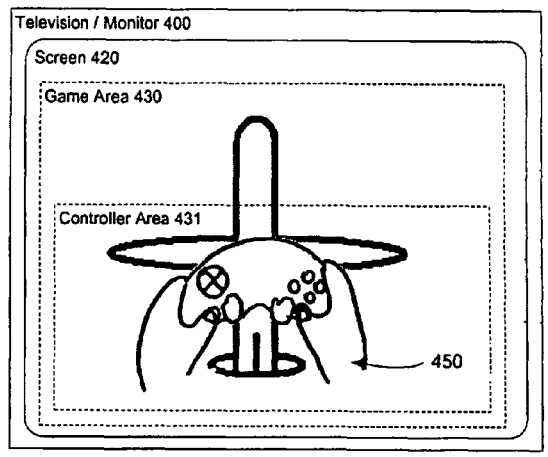
FIG. 2 illustrates an arrangement of a game data and a controller graphic in accordance with an aspect of the invention.
Figure 3:
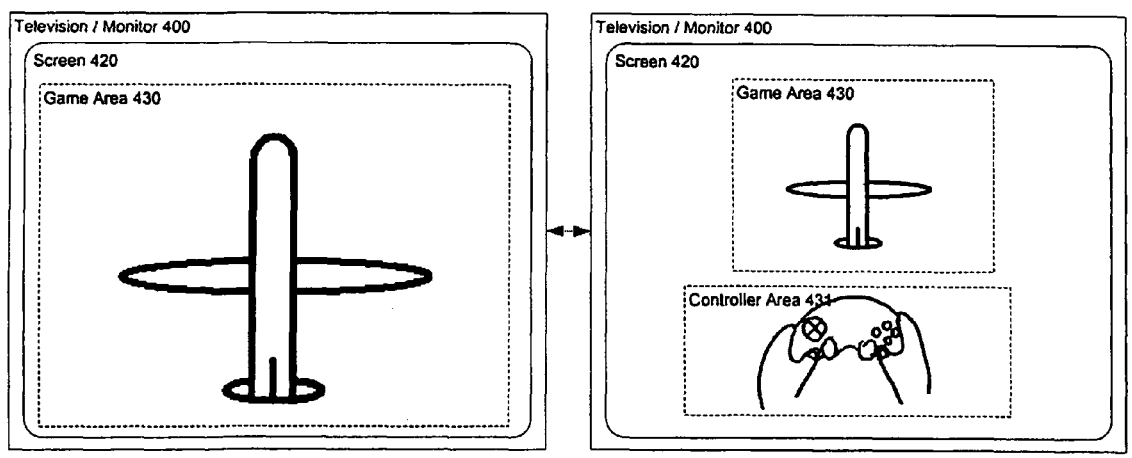
FIG. 3 illustrates an arrangement of a game data and a controller graphic in accordance with an aspect of the invention, and an arrangement of game data without a controller graphic.
Figure 4:
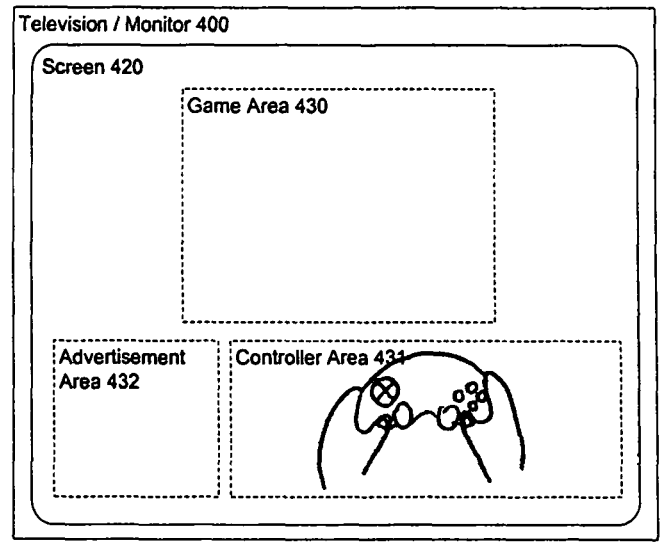
FIG. 4 illustrates an arrangement of a game data, a controller graphic and other information in accordance with an aspect of the invention.

Although the game area 430 is shown in FIG. 1 as being separate from the controller area 431, the controller graphic 450 may be located and formatted in various ways. As shown in FIG. 2, the controller area 431 may partially or completely overlay the game area 430. In such an instance, rather than completely obscuring the game action, the controller graphic may be alpha blended with the game area. As shown in FIG. 3, the controller graphic may be selectively displayed by either a user or a program as well. For example, if the user elects to display the controller graphic, the game area 430 may be shrunk to preserve its original aspect ratio and the controller area 431 displayed adjacent to the game area 430. As shown in FIG. 4, and particularly if there are unused portions of the screen, yet another area 432 of the screen may be devoted to an advertisement or other information. The advertisement may also be seamlessly woven into the game itself, such as by displaying a logo on a character's shirt.

In one aspect of the invention, and as shown in FIG. 1, console 200 is in communication with another console 500. Console 200 and second console 660 may communicate in any manner, such as over the Internet or any other communications medium. Console 660 is also connected to a monitor 600, and displays a controller graphic 450 on a screen 620.

The controller manipulation data may also be sent to any destination for rendering on any display. For example, the controller manipulation data 500 from the controller may be sent to the console 200 for rendering solely on the display directly connected to the console which is directly connected to the controller. Alternatively, the controller manipulation data may also be streamed to another console, such as console 660, for substantially simultaneous real-time display, or later display, at another console.

Figure 7:
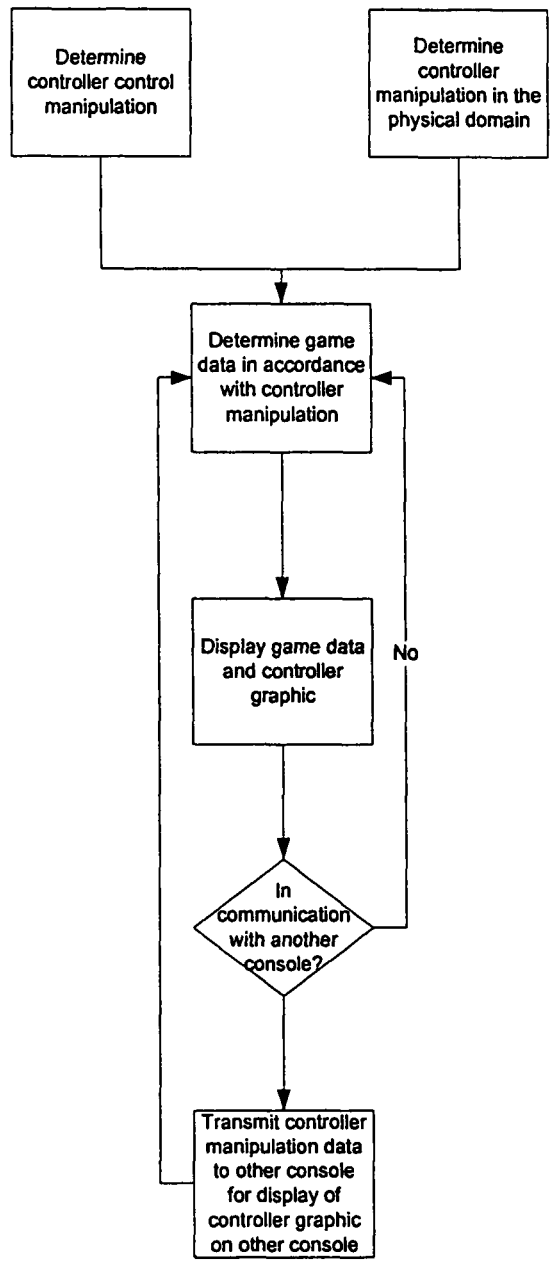
FIG. 7 illustrates an operation in accordance with an aspect of the invention.

In addition to the operation shown in FIG. 7, Various operations in accordance with a variety of aspects of the invention will now be described. It should be understood that the following operations do not have to be performed in the precise order described below. Rather, various steps can be handled in reverse order or simultaneously.

Figure 6:
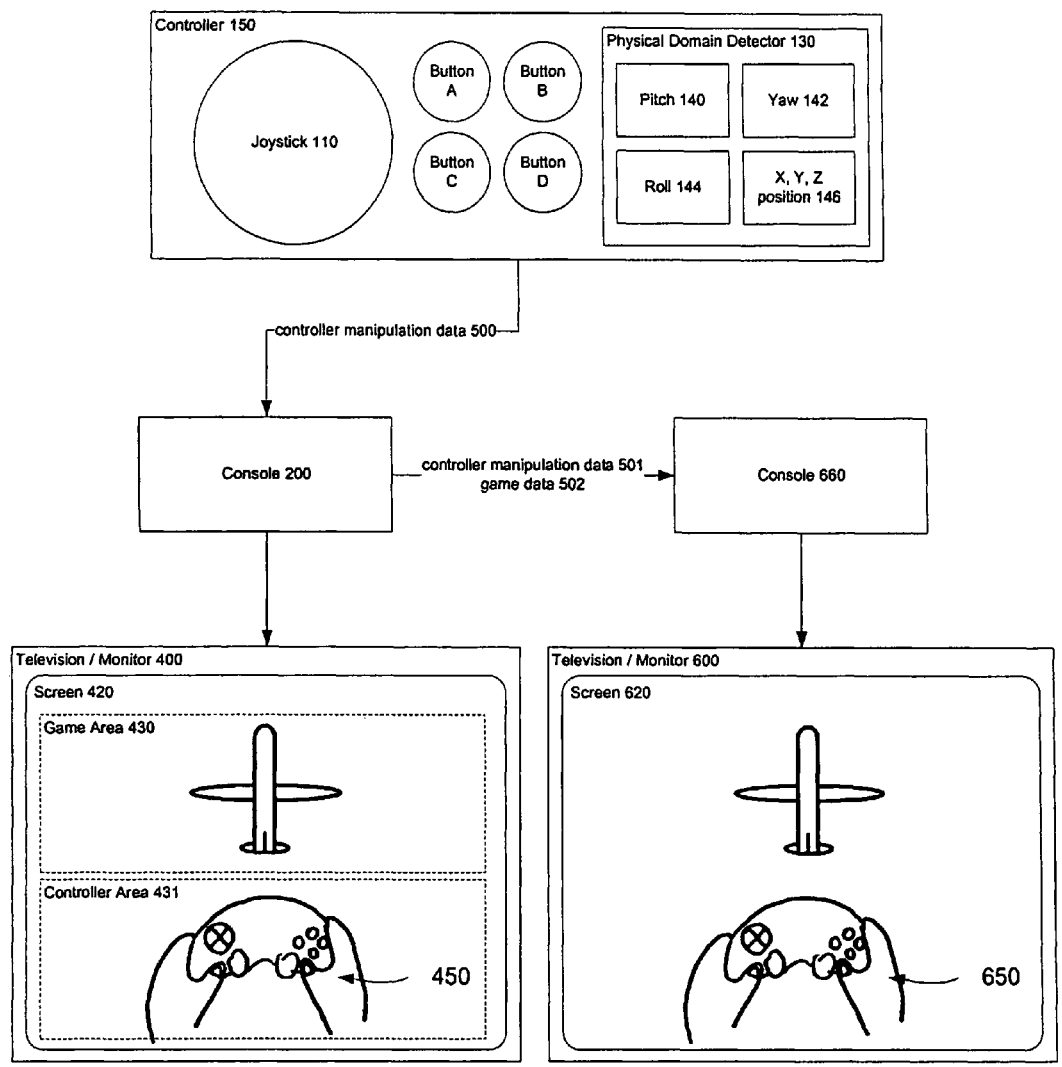
FIG. 6 illustrates a system operating in accordance with an aspect of the invention.

As shown in FIG. 6, a user at console 200 is playing a game involving airplanes. When the user manipulates controller 150, the controller manipulation data 500 is sent to console 200. Console 200, in turn, decodes the controller manipulation data 500 and in-game actions occur in response (e.g., if button A is pushed, fuel is supplied to the engines of the plane character to move the plane forward). The game is visually rendered in game area 430 of the screen 420 of monitor 400. The current state of the controller is simultaneously rendered as controller graphic 450 in controller area 431 of the screen 420. For example, button A on controller graphic 450 may light up when button A of controller 150 is pressed.

At the same time, controller manipulation data 501 is sent from console 200 to console 660. The controller manipulation data 501 sent to console 660 is related to controller manipulation data 500 sent from the controller 150 to console 200. For example, the controller manipulation data 501 may be identical to the controller manipulation data 500. Alternatively, the controller manipulation data 501 may be in a different format from controller manipulation data 500 but otherwise identical, e.g., controller manipulation data 500 may be formatted as time-based relative positions and controller manipulation data 501 may be formatted as gestures. Yet further, the controller manipulation data 501 may comprise a portion of the controller manipulation data 500.

Console 660, which is playing the same game, uses the controller manipulation data to show the game and state of controller 150 on its own monitor 600. Along with the controller manipulation data 501, console 200 may also transmit game data 502 if the game data is required or helpful in rendering the game on monitor 600.

Figure 8:
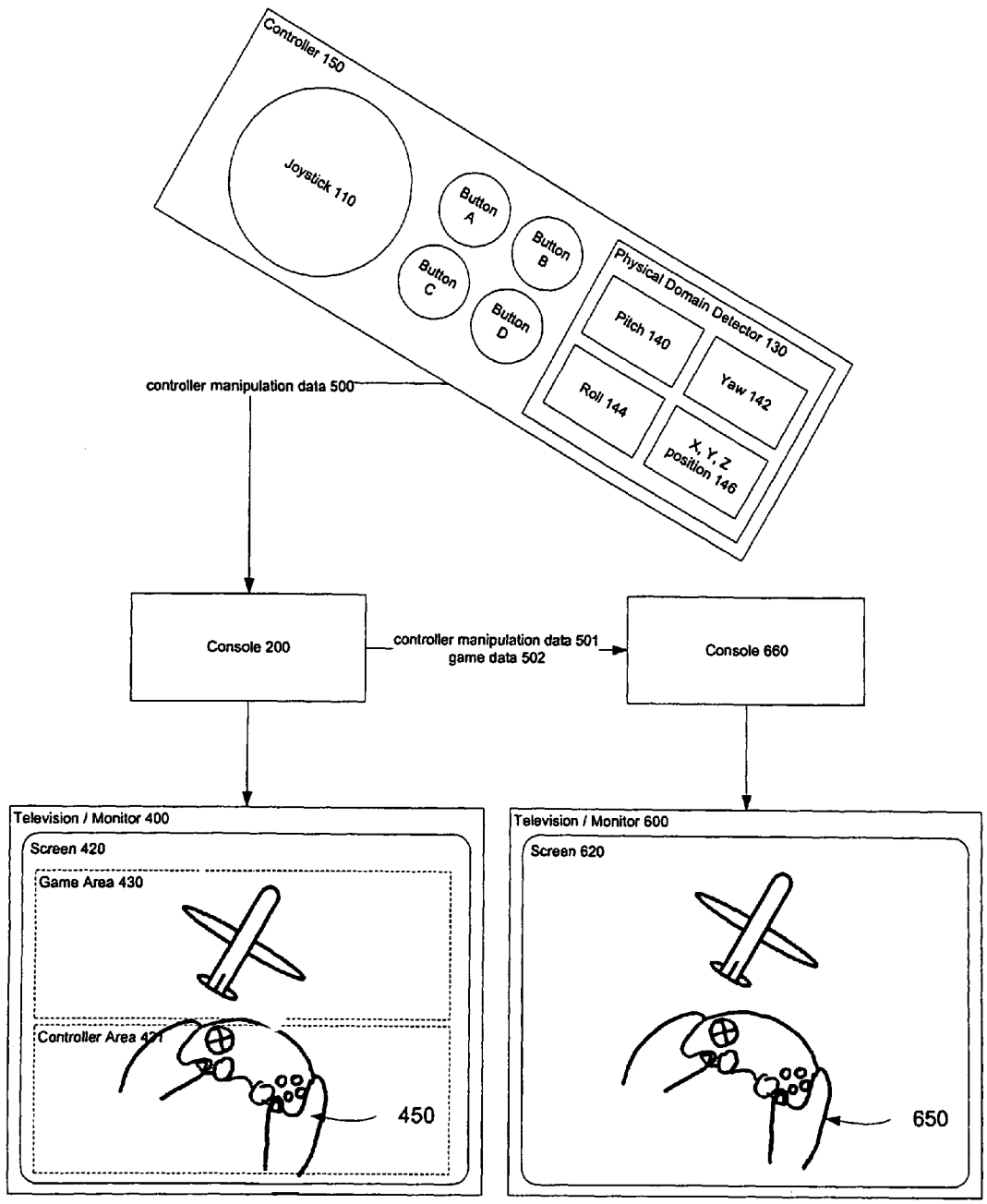
FIG. 8 illustrates a system operating in accordance with an aspect of the invention in accordance with a yaw position of the controller.
Figure 9:
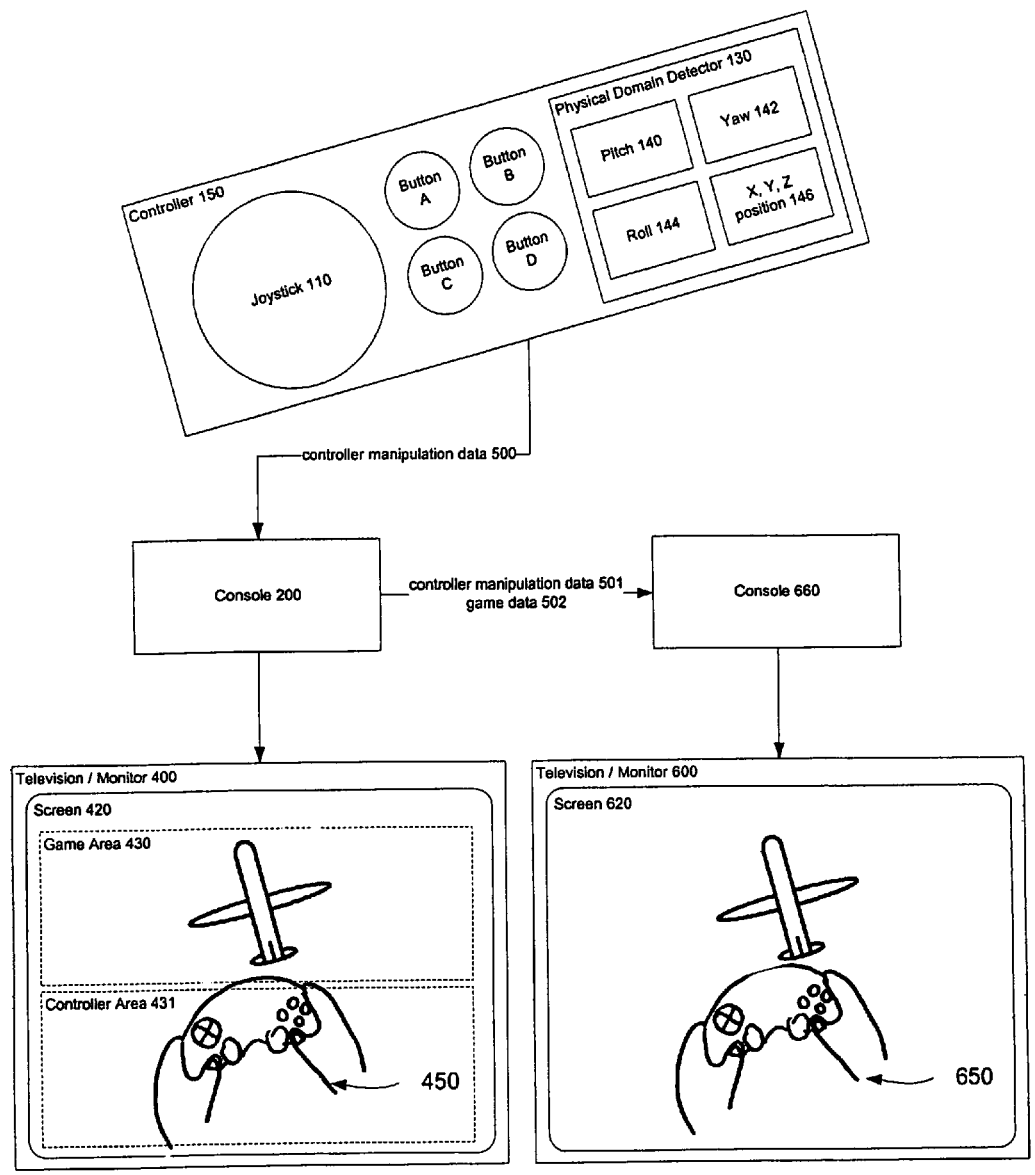
FIG. 9 illustrates a system operating in accordance with an aspect of the invention in accordance with another yaw position of the controller.

As shown in FIG. 8, when the yaw of controller 150 is manipulated in the physical domain (i.e., the yaw orientation of the controller with respect to the physical world is changed), the yaw detector 142 detects such change and the new yaw angle is reflected in the controller manipulation data 500. If the game uses yaw to manipulate the in-game character, then the change in yaw causes a change in the orientation of the game character as shown in FIG. 8. The change in yaw is also shown in controller graphic 450 rendered on the monitor connected to console 200. The change in yaw is also reflected in the controller manipulation data 501 sent to remote console 660, resulting in a consequent change in yaw position in controller graphic 650 on the monitor 660 connected to second console 660. FIG. 9 illustrates the same effect when the yaw moves in the other direction. While this maneuver may be difficult to describe to another player, it may be easily viewed and imitated.

Thus one aspect of the invention allows one console to show the state of a controller connected to a different console. Moreover, the manipulation of one controller may be rendered in real-time on two different consoles at two different locations.

Figure 10:
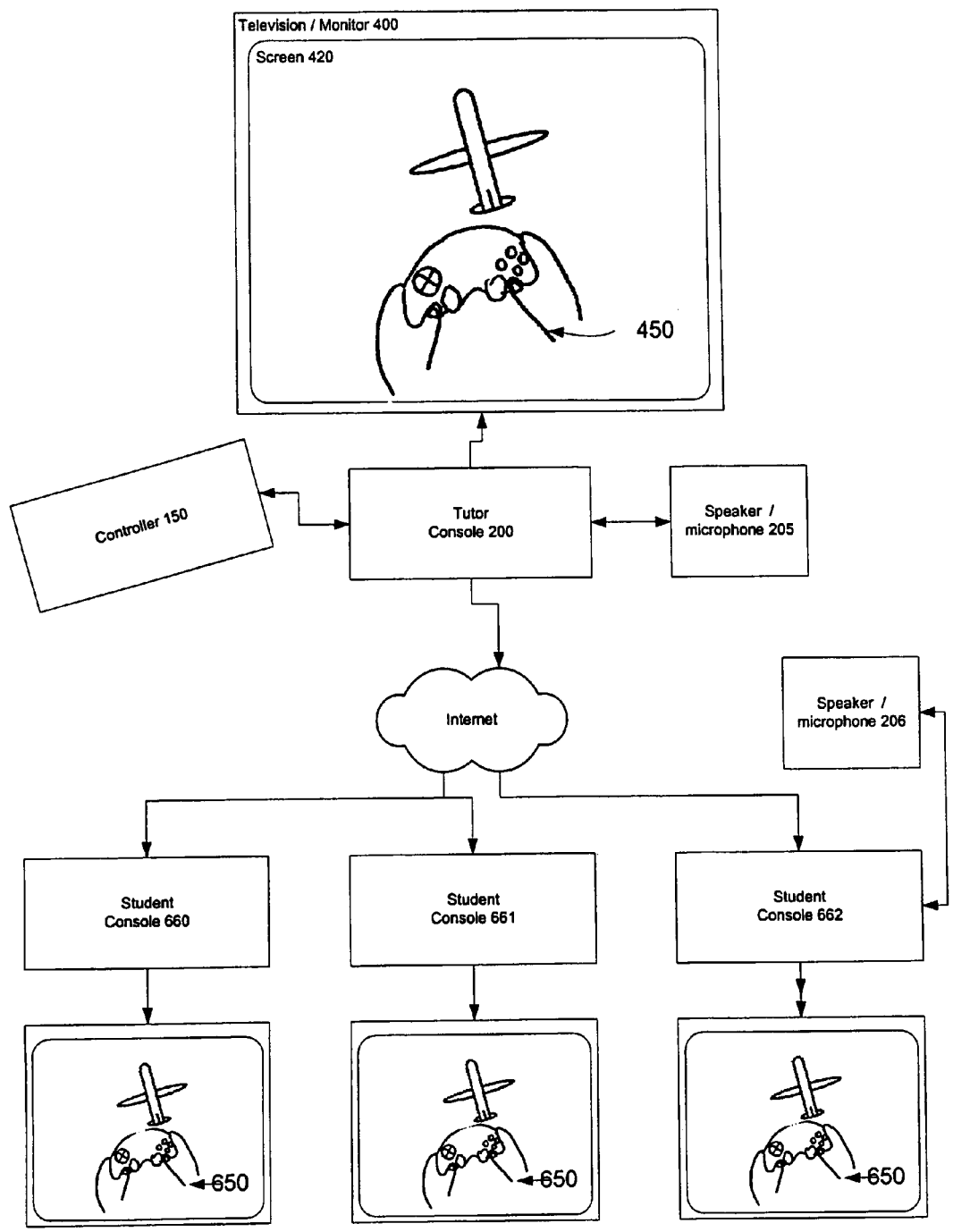
FIG. 10 illustrates a system operating in accordance with an aspect of the invention relating to tutors and students.

One aspect of the invention provides for a tutorial. In that regard and as shown in FIG. 10, the user at console 200 (hereafter, the "tutor") may teach the user at console 660 (hereafter, the "student") how to play a game. As the tutor manipulates the controller 150, the student can watch those manipulations take place on controller graphic 650 on the monitor attached to the student's console. Accordingly, the student is taught how to play the game. In this aspect, the invention provides for a real-time instruction of how to play a game—the student can watch the tutor play the game in real-time and watch the tutor's manipulation of the control in real-time. In another aspect of the invention, there are multiple student consoles 660-662, all of which receive controller manipulation data from tutor console 200.

There may also be more than one user at a single console. For example, the student consoles may be located at retails stores all over the world, and customers can watch an expert play the game. Such a session would be particularly advantageous in connection with a product rollout, because it allows the user to not only watch the game but also see how it is played. Moreover, by learning how to play the game, the students can increase their enjoyment of the game.

Preferably, the tutor console and student consoles are equipped with speakers and microphones 205-206 to allow the tutor to talk to the students. For example, a student may ask "How do you jump like that?" to which the tutor may answer "By raising my controller above the ground as follows; watch the phantom hands on your screen."

Figure 11:
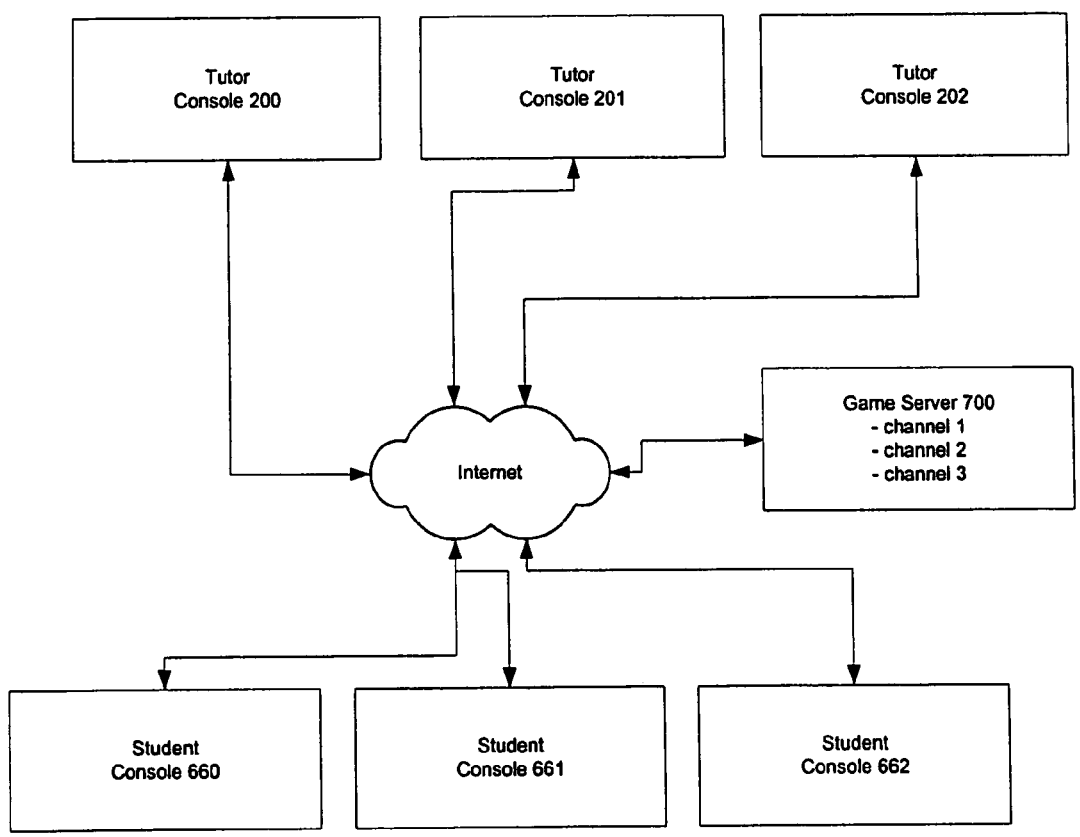
FIG. 11 illustrates a system in accordance with an aspect of the invention relating to tutors and students.

In another aspect of the invention and as shown in FIG. 11, the students can select from multiple tutorial sessions by logging into a web server such as game server 700. For example, the game server 700 may advertise multiple channels where each channel is associated with one or more tutorial sessions offered by the users at tutor consoles 200-202. To join a tutoring session, the student need only click a channel, which then causes the student console to be joined to the game with the requested tutor. The relationship between tutor console and student consoles may be one-to-one, one-to-many or many-to-one. Tutors may be awarded for their efforts, such as being provided with in-game incentives. U.S. Provisional Patent Application No. 60/860,938 describes some in-game incentives, the disclosure of which is hereby incorporated by reference.

Figure 5:
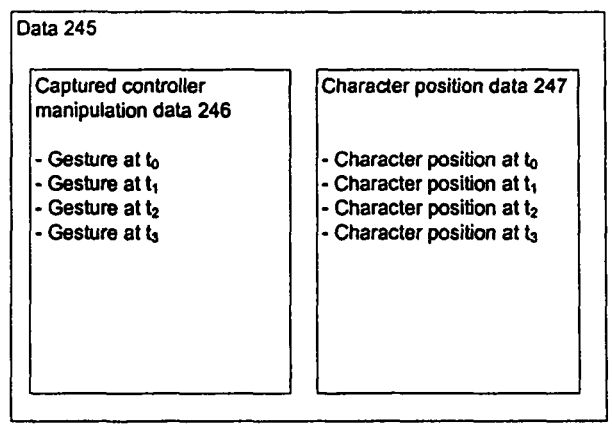
FIG. 5 illustrates controller manipulation data and character position data in accordance with an aspect of the invention.

To assist with the tutorial aspects or for other reasons, controller manipulation data may be recorded along with other game data. As shown in FIG. 5, data 245 may store the controller manipulation data 246 received from the controller 150 and what happened in the game as a result, such as data 247 representing the position of a game character. The captured controller manipulation data 246 and the character position data 247 are preferably synchronized, thus enabling the consoles to replay and render not only the game action but also the corresponding controller manipulation as well. This allows the student to use the game instructions to replay (and show) the manipulation of the control and the corresponding action in the game. For example, in addition to playing back a touchdown thrown in a football game, the console can display the controller manipulations which resulted in the touchdown. In another aspect of the invention, the game data and corresponding controller manipulation data can be played back in slow motion.

Rather than separately storing and synchronizing the controller manipulation data and game data over time, as well as the game instructions necessary to playback the game data and controller manipulations, the three may be combined and stored as a movie in another aspect of the invention. Alternatively, the played game and controller graphic may be stored as a movie file such as an MPEG file.

Figure 12:
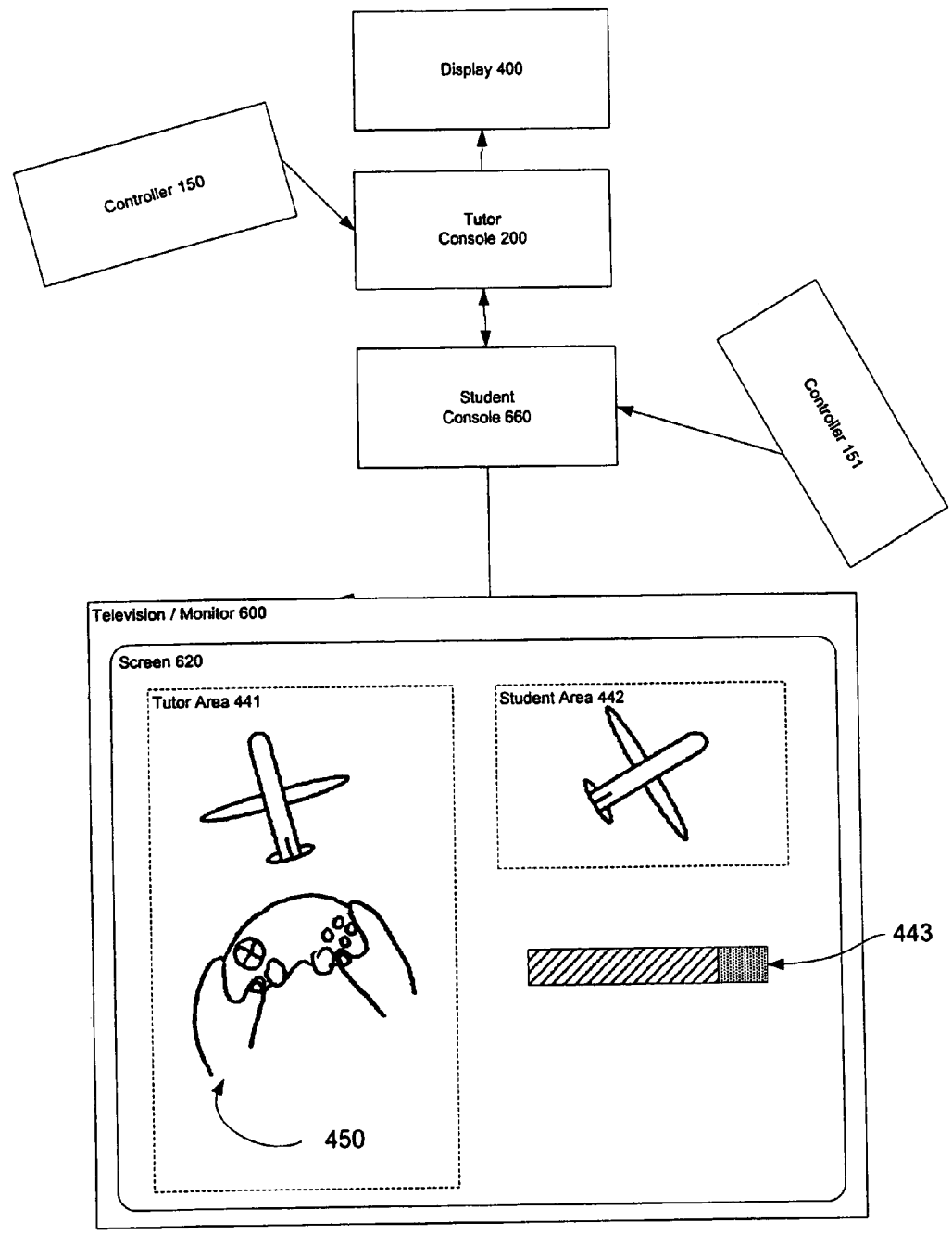
FIG. 12 illustrates a system operating in accordance with an aspect of the invention relating to tutors and students.

In another aspect of the invention, the student attempts to mimic the tutor as shown in FIG. 12. Controller graphic 450, which corresponds with the tutor's manipulation of its controller 150, is shown on the student's screen 620 as described above. The in-game character responsive to the tutor's movements is also shown in the tutor area 441 of the student's screen. The student's in-game character responsive to the student's manipulation of controller 151 is shown in student area 442, which is preferably shown side-by-side with the tutor's in-game character. The student must try to mimic the actions of the tutor so that the movement of the student's in-game character matches perfectly with the movement of the tutor's in-game character. A feedback graphic such as bar 443 may also be displayed to the student, where the bar's length corresponds with how closely the student is mimicking the tutor. Audio feedback may also be used, such that a sound changes depending on well the student is synchronized with the tutor. Rather than displaying the two characters side-by-side, the student's character may also be overlaid on top of the tutor's character (with or without alpha-blending), so that the student's goal is to keep his or her character directly on top of the tutor's character.

If the controller manipulation data is pre-recorded or calculated on the fly, the tutor may comprise artificial intelligence. For example, instead of watching a live tutor's manipulation of a controller in real-time, the student may watch or respond to a live tutor's pre-recorded controller manipulation data. Alternatively, the student may watch or respond to controller manipulation data generated by a computer.

Although the system is described with respect to video/electronic games, it will be understood by those of skill in the art that the same technology may be applied to many other uses. For example, an aerospace school might employ this technology for pilot training through flight simulation. Accordingly, the examples described should not be construed as limiting or exhaustive. Rather, it is to be understood that the embodiments described are merely illustrative of the principles and applications of the present invention. Therefore, numerous modifications may be made to the illustrative embodiments and other arrangements may be devised without departing from the spirit and scope of the present invention as defined by the appended claims.

The invention claimed is:

1. A method of displaying data comprising:
    detecting a three-dimensional position, orientation, and manipulation of a device operated by a human guide, in the physical domain, during a processor-implemented game at a first location on a network;
    receiving the detected three-dimensional position, orientation, and manipulation of the device at the first location on the network as controller manipulation data;
    transmitting the controller manipulation data to a second location on the network; and
    displaying, at the second location on the network, the game substantially simultaneously with displaying the three-dimensional position, orientation, and manipulation of a graphic of the device based on the controller manipulation data, wherein the displaying of the three-dimensional position, orientation, and manipulation of the graphic of the device comprises displaying computer-generated hands of the human guide depicting hand positions of the human guide corresponding to the three-dimensional position, orientation, and manipulation of the device.

2. The method of claim 1 wherein the position relates to the three-dimensional location of the device.

3. The method of claim 1 wherein the orientation of the device relates to the yaw, pitch or roll of the device.

4. The method of claim 3 wherein displaying the graphic representing the device comprises orienting the graphic relative to the screen.

5. The method of claim 1 further comprising representing the position, orientation, and manipulation of the device with data, and transmitting the data to a second device.

6. The method of claim 5 wherein the second device displays a graphic representing the position or orientation of the device.

7. The method of claim 6 wherein the second device displays the graphic substantially simultaneously with the second device receiving the transmitted data.

8. The method of claim 1 wherein the game is rendered by a dedicated game console.

9. The method of claim 1 further comprising changing the position of a character in the game based on the detected position or orientation of the device, and displaying the character substantially simultaneously with displaying the graphic representing the position or orientation of the device.

10. A system for displaying physical domain related information comprising:
    a controller, at a first location on a network, having user-operable controls;
    a detector, at the first location on the network, detecting the physical three-dimensional position or three-dimensional orientation of the controller being operated by a human guide; and
    a processor, in communication with a display at a second location on the network:
    wherein the processor displays, on a display, a graphic of the three-dimensional position, orientation and manipulation of the user-operable controls of the controller at the first location on the network; and
    wherein the graphic is overlaid with computer-generated hands of the human guide that depicts hand positions of the human guide corresponding to the three-dimensional position, orientation, and manipulation of the user-operable controls of the controller.

11. The system of claim 10 further comprising a game console containing the processor.

12. The system of claim 11 wherein the game console includes instructions for displaying a game substantially simultaneously with the graphic.

13. The system of claim 12 wherein changing the physical position or orientation changes data used by the game.

14. A method of displaying controller and other information comprising:
    determining, at a first location on a network, the three-dimensional position or three-dimensional orientation of a controller in a physical domain based on manipulation of controls on the controller by a human guide;
    rendering, at a second location on the network, a graphic of the controller on a display in response to the determined three-dimensional position, orientation or manipulation of the controller, wherein:
    the graphic of the controller indicates changes to the three-dimensional position, orientation and manipulation of the controls on the controller; and the graphic of the controller is overlaid with computer-generated hands of the human guide that depicts hand positions of the human guide corresponding to determined three-dimensional position, orientation, or manipulation of the controller.

15. The method of claim 14 further comprising transmitting the determined position, orientation and manipulation to another device via a communication medium.

16. The method of claim 15 wherein the communication medium is a network.

17. The method of claim 15 further comprising rendering a graphical representation of the controller on a display associated with said other device, said graphical representation indicating changes to the position, orientation and manipulation of the controls on the controller.

18. The method of claim 15 further comprising:
    modifying character data in response to a change in the determined position, orientation or manipulation of the controller, the character data comprising a graphic other than the graphical representation of the controller;
    simultaneously displaying the character data and the graphical representation of the controller on a display.

19. The method of claim 18 wherein the character data is a character in a game.

20. The method of claim 18 wherein the display is connected to a game console.

* * * * *